United States Patent [19]
Mosing et al.

[11] Patent Number: 5,810,401
[45] Date of Patent: Sep. 22, 1998

[54] THREADED TOOL JOINT WITH DUAL MATING SHOULDERS

[75] Inventors: Donald E. Mosing; David L. Sipos, both of Lafayette, La.

[73] Assignee: Frank's Casing Crew and Rental Tools, Inc., Lafayette, La.

[21] Appl. No.: 643,970

[22] Filed: May 7, 1996

[51] Int. Cl.$^6$ .................................................. F16L 25/00
[52] U.S. Cl. ........................... 285/333; 285/355; 285/390
[58] Field of Search ..................... 285/333, 334, 285/355, 390

[56] References Cited

U.S. PATENT DOCUMENTS

| | | | |
|---|---|---|---|
| 3,870,351 | 3/1975 | Matsuki | 285/334 |
| 4,153,283 | 5/1979 | Hellmund et al. | 285/334 |
| 4,192,533 | 3/1980 | Blose | 285/334 |
| 4,298,221 | 11/1981 | McGugan | 285/328 |
| 4,373,754 | 2/1983 | Bollfrass et al. | 285/334 |
| 4,407,527 | 10/1983 | Reimert | 285/27 |
| 4,429,904 | 2/1984 | Reimert | 285/24 |
| 4,522,431 | 6/1985 | Reimert | 285/27 |
| 4,525,001 | 6/1985 | Lumsden et al. | 285/328 |
| 4,537,428 | 8/1985 | Landriault | 285/333 |
| 4,548,431 | 10/1985 | Hall et al. | 285/334 |
| 4,564,225 | 1/1986 | Taylor | 285/333 |
| 4,629,221 | 12/1986 | Lumsden et al. | 285/328 |
| 4,703,954 | 11/1987 | Ortloff et al. | 285/115 |
| 4,728,129 | 3/1988 | Morris | 285/334 |
| 4,732,416 | 3/1988 | Dearden et al. | 285/333 |
| 4,735,444 | 4/1988 | Skipper | 285/355 X |
| 4,822,081 | 4/1989 | Blose | 285/334 |
| 4,838,491 | 6/1989 | Bennett et al. | 285/355 X |
| 4,974,882 | 12/1990 | Watts | 285/333 |
| 5,092,635 | 3/1992 | DeLange et al. | 285/334 |
| 5,330,239 | 7/1994 | Blose et al. | 285/328 |
| 5,348,350 | 9/1994 | Blose et al. | 285/94 |
| 5,419,595 | 5/1995 | Yamamoto et al. | 285/334 |

*Primary Examiner*—Heather Shackelford
*Attorney, Agent, or Firm*—Matthews & Associates

[57] ABSTRACT

A tool joint for use in connecting sections of pipe string for use in drilling. The joint is a pin and box connection of the type used in oil well tubing, casing, and the like. The driveable threaded joint has dual mating shoulders and nose faces on the pin and box members. The connection is designed so that compressive loads on the pin and box members are transferred substantially through the pin and box shoulders rather than through the thread form. The dual mating shoulders substantially improve the joint's ability to withstand the intense axial compression loading that occurs when driving the pipe into the ground.

8 Claims, 5 Drawing Sheets

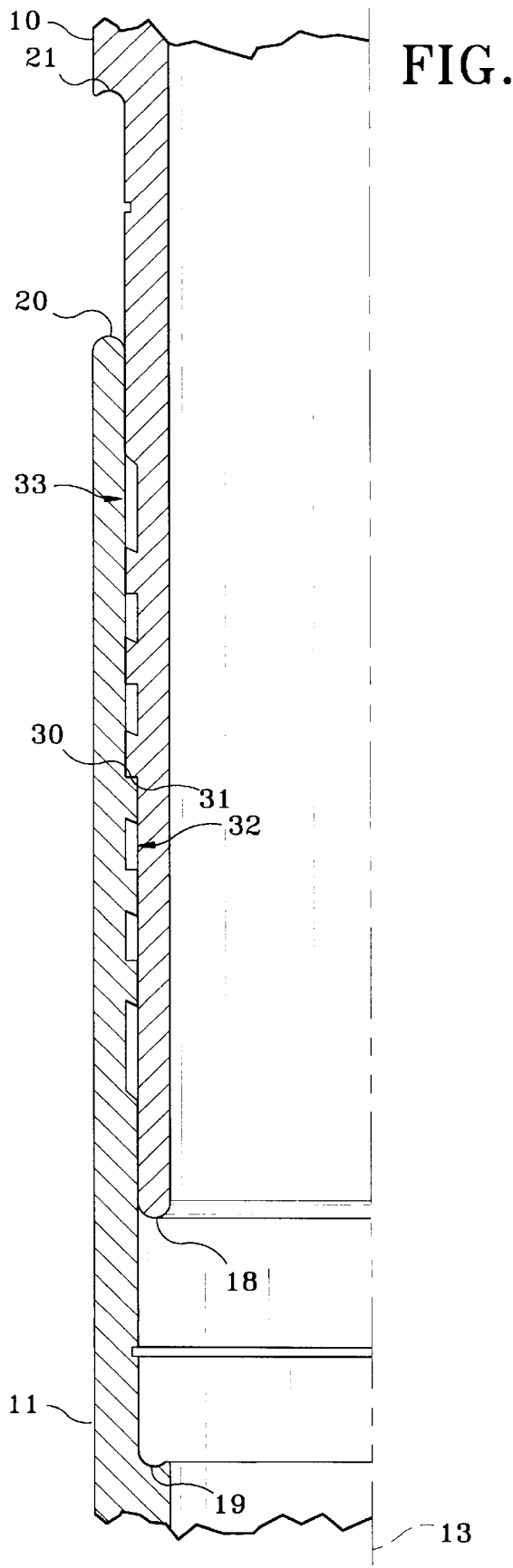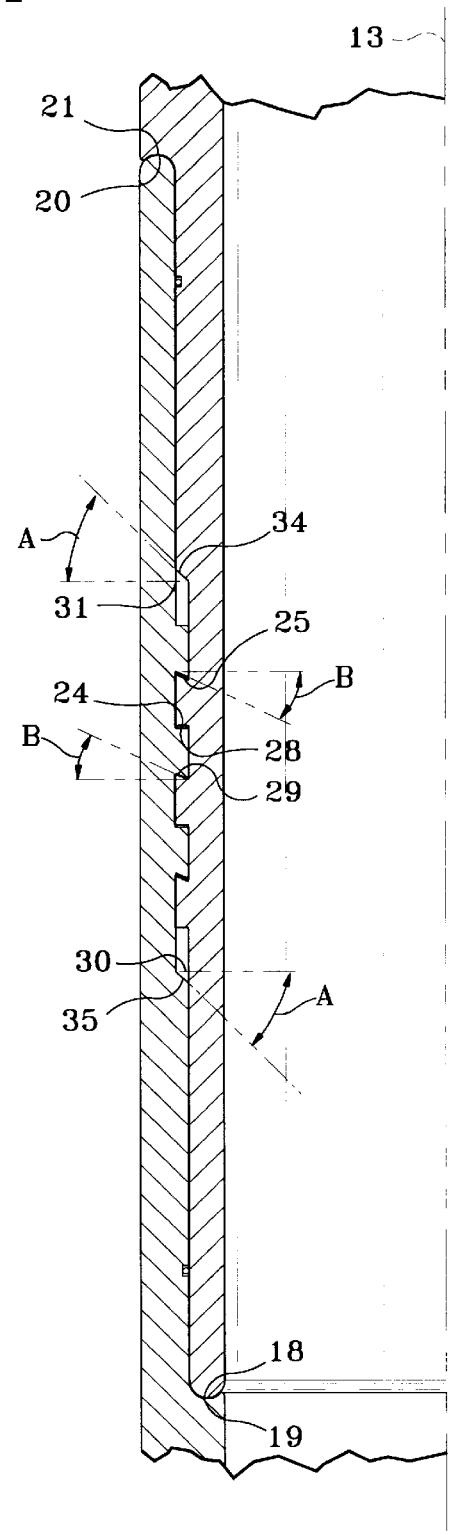
FIG. 4
FIG. 5

THREADED TOOL JOINT WITH DUAL MATING SHOULDERS

BACKGROUND

1. Field of the Invention

The present invention relates to pipe connectors, particularly, but not exclusively, for use in connecting sections of a pipe string for use in drilling. More specifically, it relates to the design of a pin and box connection of the type used in oil well tubing, casing, and the like. The invention provides a driveable threaded joint with dual mating shoulders and nose faces on the pin and box members. The dual mating shoulders substantially improve the joint's ability to withstand the intense axial compression loading that occurs when driving the pipe into the ground.

2. Description of the Related Art

Threaded connections between pipe members are typically made by providing one end of one pipe member with a male connector in the form of an externally threaded pin member, and providing one end of second pipe member with a female connector in the form of an internally threaded box member which receives the pin member. The pin and box members may be integral parts of their respective pipe members, or may be added thereto by welding or threaded engagement.

In the past, several different types of threaded connections have been designed to manage the extreme compressive, tensile, and bending forces to which the connection is exposed. Several prior art designs incorporate internal and/or external mating shoulders and end faces on the pin and box members. As used in this description, the terms "end face" and "nose face" are interchangeable. In several designs, the mating shoulders are used as torque shoulders to stop axial advancement of the pin and box members during make-up of the joint. In many designs, the shoulders are also used to provide resistance to axial compression during pile driving. Although many prior art designs use a combination of external and internal shoulders, these designs are usually configured such that only one of the shoulders will mate with its corresponding nose face upon initial make-up of the joint. These designs rely on either the external or the internal shoulder alone to mate with its corresponding nose face upon initial make-up of the joint, with the other shoulder remaining axially spaced from its corresponding nose face. The shoulder that is axially spaced from its corresponding nose face at initial make-up may not actually mate until final make-up of the joint, and in some designs may never mate, or only make contact with its corresponding nose face after the threads or other portions of the joint begin to yield. It is one object of the present invention to provide a threaded connection design that uses dual mating shoulders in which both internal and external shoulders mate with their corresponding nose faces during initial make-up of the joint. By providing dual mating shoulders, the shoulders share axial compression loads and provide the joint with improved performance in resisting the extreme axial compression loads encountered during pile driving.

In addition to providing resistance to axial compression loading, the dual mating shoulders in the present invention also function as torque shoulders to stop axial advancement of the pin and box members during make-up of the joint. In several prior art designs, the threaded connections use converging or wedge-type thread flanks rather than shoulders to act as a torque stop. As used in this description, the terms "converging" and "wedge-type" are interchangeable.

In general, the pin and box threads in a converging thread flanks connection have progressively changing axial widths. The axial thread width of the pin member progressively decreases in the direction of the mouth of the pin member over the length of the thread structure. The axial thread width of the box member, on the other hand, progressively decreases in the opposite direction, such that a pair of pin and box members in the fully made up condition have a mutually wedging interfit. When converging threads are screwed together and wedging between the flanks takes place, the torsional resistance of the connection increases as the thread flanks act as a torque stop to halt axial advancement of the pin and box members. Several other threaded connection designs use tapered buttress-type thread forms that rely on radial interference to stop axial advancement of the pin and box members during make-up. In a tapered threads configuration, the radial interference fit forms as the crests and roots of the pin and box threads converge upon make-up of the joint Although these thread form designs may succeed in providing a torque stop to halt axial advancement of the pin and box members during make-up, and also allow the threads to provide resistance to axial compression loading, taking pressure off any pin and box shoulders that may be used in the design, such use of an interference fit in the thread form has its drawbacks. Such uses of interference fits in the thread form may create high surface contact stress on the threads, which can cause galling and other localized thread damage that can severely limit the number of times the connection can be made up. In addition to limiting the repetitive use of the threads, the areas of high surface contact stress are susceptible to stress corrosion cracking, known as sulfide stress cracking, that occurs in petroleum well conduits. It is one object of this invention to provide a threaded joint connection that uses the shoulders of the pin and box members rather than the threads to function as a torque stop.

Conventionally, the pin member of the joint is tapered inwardly from the proximal end of the threaded portion to the distal end to mate with a similarly tapered female threaded box member. The taper facilitates entry of the pin member into the box member. Although the taper facilitates entry of the pin member, the wall thickness at the nose face end of a tapered thread form is often very small, especially in a flush joint configuration. Although the wall thickness at the shoulder of the pin and box member may be a substantial portion of the pipe wall thickness, with the shoulder occupying only a small portion of the wall, the wall thickness at the nose face end may be very small. This tapered configuration leaves the nose face end with a reduced wall thickness that must withstand the extreme axial compression during pile driving, as well as the extreme tensile, compressive, and bending forces to which the pipe is exposed downhole. It is one object of the present invention to provide a threaded pin and box joint in which the thread form is straight rather than tapered, to allow substantially the full one-half thickness of the wall of the pin and box members for sustaining compressive, tensile, and bending forces to which the pipe is exposed.

Although a tapered thread form may facilitate entry of the pin into the box member during make-up of the joint, tapered threads are still susceptible to cross-threading if the pin and box members are not properly aligned at the point of threaded engagement. One example of an apparatus designed to prevent cross-threading is found in U.S. Pat. No. 4,407,527, issued to Mr. Larry E. Reimert. The Reimert patent discloses a guide surface axially spaced from the internal threads of the box member to constrain the relative orientation between the pin and box members prior to threaded engagement. Although the Reimert design may be successful in preventing cross-threading, we have found that the guiding means may also be integrated into a mating shoulder configuration by axially spacing the nose face from the threads on the pin and box members. It is therefore one object of this invention to provide a guiding means for preventing cross-threading that is integrated into the shoulders and nose faces of a pin and box connection.

Several further objects of the present invention include providing means for preventing separation of the pin and box members, providing a thread form configuration that allows quick make-up of the joint, as well as several other objects and advantages that will become apparent from a reading of the attached claims and description of the preferred embodiments.

SUMMARY

These and other objects of the invention are attained by providing one end of one pipe member with a male connector in the form of an externally threaded pin member, and providing one end of second pipe member with a female connector in the form of an internally threaded box member which receives the pin member. The pin and box members may be integral parts of their respective pipe members, or may be added thereto by welding or threaded engagement. In the preferred embodiment of the present invention the pin and box members are integral parts of their respective pipe members, but it should be understand that the inventive design may also be used by mounting the pin and box members on their respective pipe members, or could be used in any of the various forms of collars or nipples known in the art featuring combinations of two box ends, two pin ends, or a box end with a pin end for threaded connection to appropriate ends of two pipe members sought to be mutually connected.

The threaded connection has dual mating shoulders in which both the internal and the external shoulder mates with its corresponding nose face during initial make-up of the joint. By providing dual mating shoulders, the shoulders share axial compression loads and provide the joint with improved performance in resisting the extreme axial compression loads encountered during pile driving. In addition to providing resistance to axial compression loading, the dual mating shoulders in the present invention also function as torque shoulders to stop axial advancement of the pin and box members during make-up of the joint. The thread form on the pin and box members is straight, rather than tapered, and does not have converging thread flanks, so the threads do not act as a torque stop, nor do they provide any substantial portion of the resistance to the extreme axial compression loading encountered during pile driving.

By providing dual mating shoulders that share axial compression loads, and by using a thread form having straight threads with uniform axial thread widths, the compressive loads on the pin and box members are transferred substantially through the shoulders rather than through the thread form. This configuration allows the shoulders to take the brunt of the axial compression loading and spare the threads. This configuration avoids high surface contact stress on the threads to prevent galling and other localized thread damage that would severely limit the number of times the connection can be made up. This configuration also helps to prevent stress corrosion cracking that occurs in areas of high surface contact stress that are exposed to sulfide in petroleum wells. The use of a straight thread form, rather than tapered, provides substantially the full one-half thickness of the wall of the pin and box members for sustaining compressive, tensile, and bending forces to which the pipe is exposed.

The straight thread form provides substantially the full one-half thickness of the wall of the pin and box members for sustaining the forces to which the pipe is exposed, but the ideal design of the pin and box members results in the wall thickness of the pin and box members being not precisely one-half the connector thickness. The optimal design provides that the pin and box members will be of equal strength. In order to design the pin and box members to be of equal strength, the pin and box members are configured to have equal annular cross-sectional areas. Because the inner diameter of the box member is aligned with the outer diameter of the pin member, the medial diameter of the box member is larger than the medial diameter of the pin member. To design the pin and box members to be of equal strength, the wall thickness of the pin member (the member with a smaller medial diameter) is increased to slightly greater than one-half the total wall thickness of the connection, and the wall thickness of the box member (the member with a larger medial diameter) is decreased to slightly less than one-half the total wall thickness of the connection. This optimal design provides substantially the full one-half thickness of the wall of the pin and box members for sustaining the forces to which the pipe is exposed, but also provides that the wall thickness of the pin and box members will be slightly other than precisely one-half the connector thickness, in order to provide that the pin and box members will be of equal strength.

The present invention also provides an integrated guiding means to facilitate entry of the pin into the box member. This integrated guiding means also functions as a self-centering means to align the pin and box members upon threaded engagement to avoid cross-threading. The integrated guiding and self-centering means is achieved by providing a design in which the shoulders and nose faces of the pin and box members are axially spaced from their most adjacent thread flanks. This configuration facilitates entry of the pin into box member, and constricts the relative orientation of the pin and box members at the point of threaded engagement, thus avoiding cross-threading.

Another feature of the present invention is the use of trapped thread flanks to prevent separation of the pin and box members. Conventional pin and box connections are susceptible to separation, often called "jumpout," when the connection is subjected to extensive axial tension and/or bending type loads. Under axial loading in tension, the pin member will shrink due to the "Poisson's" effect, and the box member will expand or "bell out," a condition known as "belling." To counteract these conditions, the thread form is provided with reverse angle load flanks, often referred to as "trapped" or "hooked" thread flanks. When the connection is subjected to axial loads in tension, the trapped load flanks cause the pin member to be pulled radially outward toward the box member, and the box member to be pulled radially inward toward the pin member. This feature secures the pin and box members together and prevents jumpout that could otherwise cause failure of the joint. By placing the box member in a state of hoop compression and the pin member in hoop tension, the trapped load flanks also serve to counteract induced assembly stresses and improve the joint's strength in sulfur environments that could otherwise make the joint susceptible to stress corrosion or hydrogen embrittlement fracture.

In addition to providing trapped thread flanks to prevent jumpout, the present invention provides trapped nose faces as well. Some prior art designs provide mating shoulders and nose faces having dissimilar angles so that the shoulder traps the nose face. One example is found in U.S. Pat. No. 4,822,081, issued to Thomas L. Blose. The Blose patent discloses a shoulder and nose face having dissimilar angles so that the shoulder traps the nose face and the nose face will not slip out upon the application of axial driving force. The present invention improves on this type of feature by providing a trapped nose face that is radially balanced to provide a radially balanced resistance to axial loading in compression. The radially balanced nose face efficiently distributes compressive forces and allows the nose face to withstand increased compressive loading without yielding.

Another feature of the present invention is a thread form configuration that provides a quick make-up of the joint. As can be seen in the drawings more fully described below, the preferred embodiment provides complete make-up of the joint in approximately one and one-half turns, a feature which offers great advantages in the field. The present invention will be more fully understood from the following description of the preferred embodiments, given by way of example only, with reference to the accompanying drawings.

BRIEF DESCRIPTION OF THE DRAWINGS

FIG. 4 shows a partial cross-section of the threaded connection prior to make-up of the joint.

FIG. 5 shows a partial cross-section of the threaded connection in the fully made-up condition.

DETAILED DESCRIPTION

Figure 1:
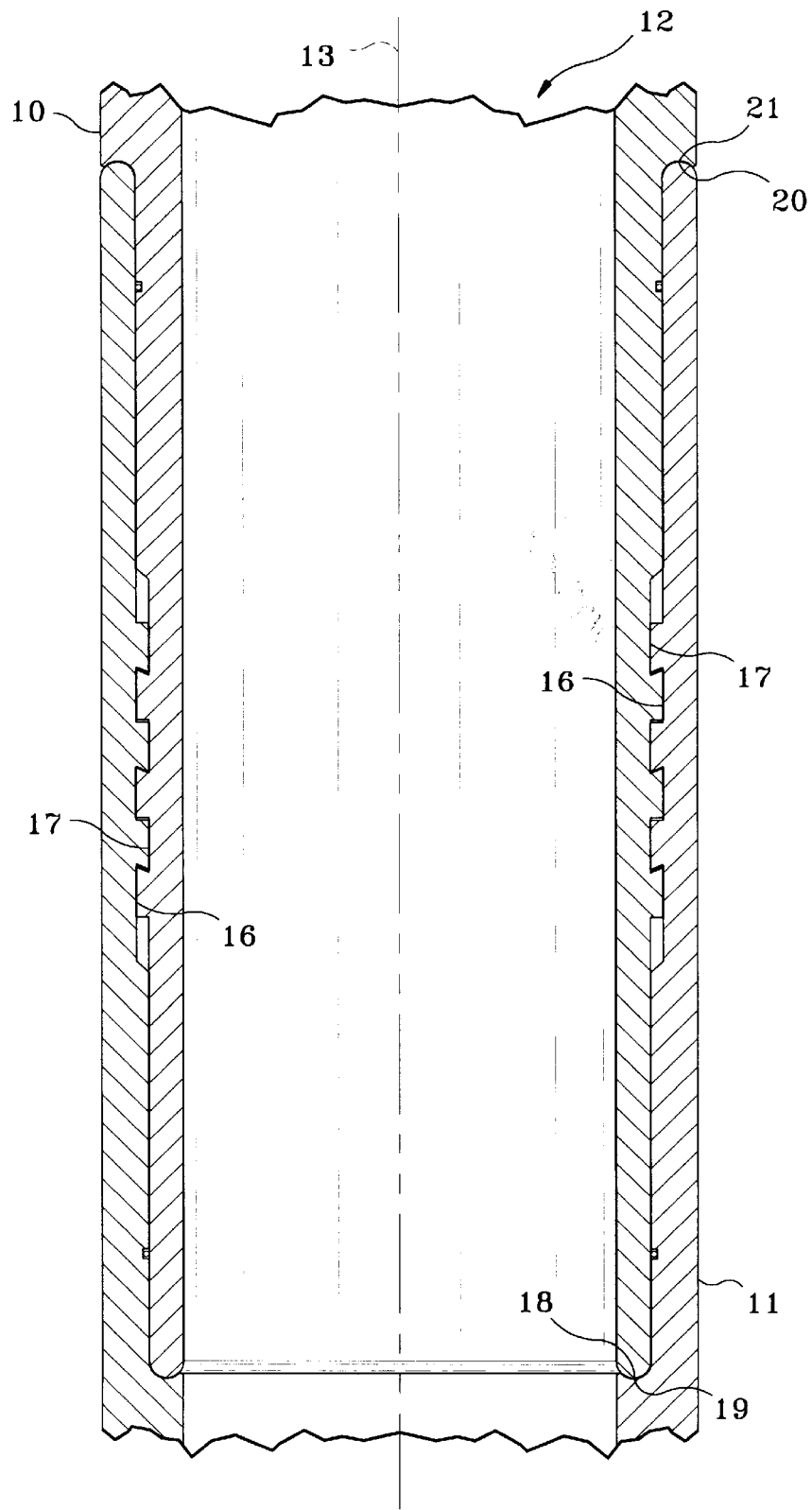
FIG. 1 shows a cross-sectional view of a tool joint constructed in accordance with this invention.

FIG. 1 shows a cross-sectional view of a threaded connection according to the present invention with the pin and box members in a fully made up condition. FIG. 1 shows upper pin member 10 secured into a lower box member 11 to form a connection designated generally as 12 along axis 13. In a preferred embodiment, the threaded connection 12 has mating pin and box members having outside diameters and inside diameters substantially identical for each of the two members. This is commonly referred to as a flush connection when assembled. The flush connection is preferred in practice to avoid irregularities on the outer surface of the joint that cause resistance when driving the casing into the ground or when running the pipe through the well bore. Although the flush connection is preferred, the present invention is not limited to flush connections. Nor is the invention limited to the pin and box members being integral parts of their respective pipe members. The pin and box members may be integral parts of their respective pipe members, or may be added thereto by welding or threaded engagement. Still referring to FIG. 1, the threaded connection 12 includes pin member threads 16 that are adapted to be made-up with box member threads 17. Also shown in FIG. 1 are pin member nose face 18, box member shoulder 19, box member nose face 20, and pin member shoulder 21.

Figure 2:
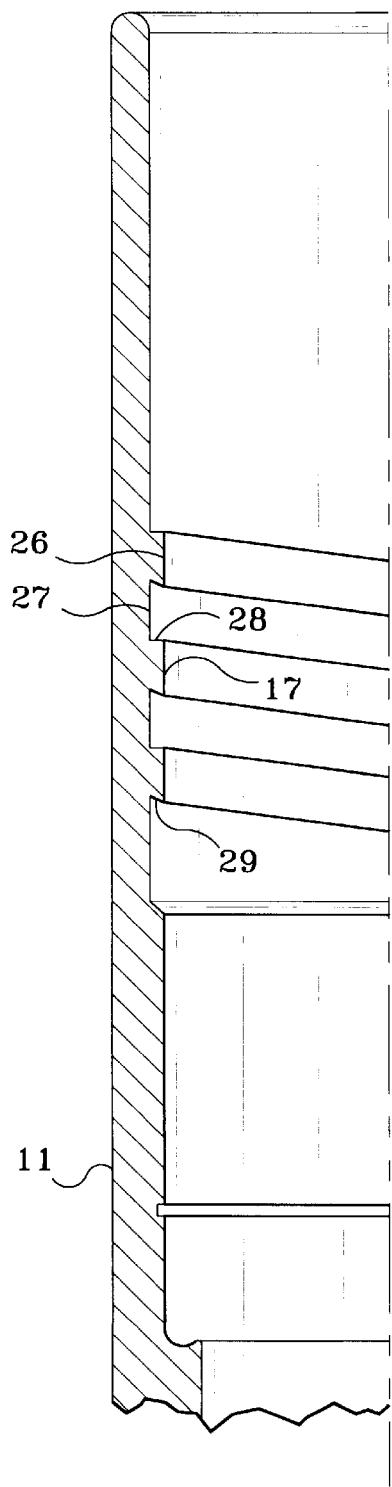
FIG. 2 shows a partial cross-section of a box member.

FIG. 2 shows a partial cross-section of the box member 11. The box member 11 includes box member threads 17 having box thread crests 26 and roots 27. The box member threads 17 also include stab flanks 28 and load flanks 29. The term stab flank refers to the side of the thread facing inwardly towards the joint, and the term load flank refers to the side of the thread facing away from the joint.

Figure 3:
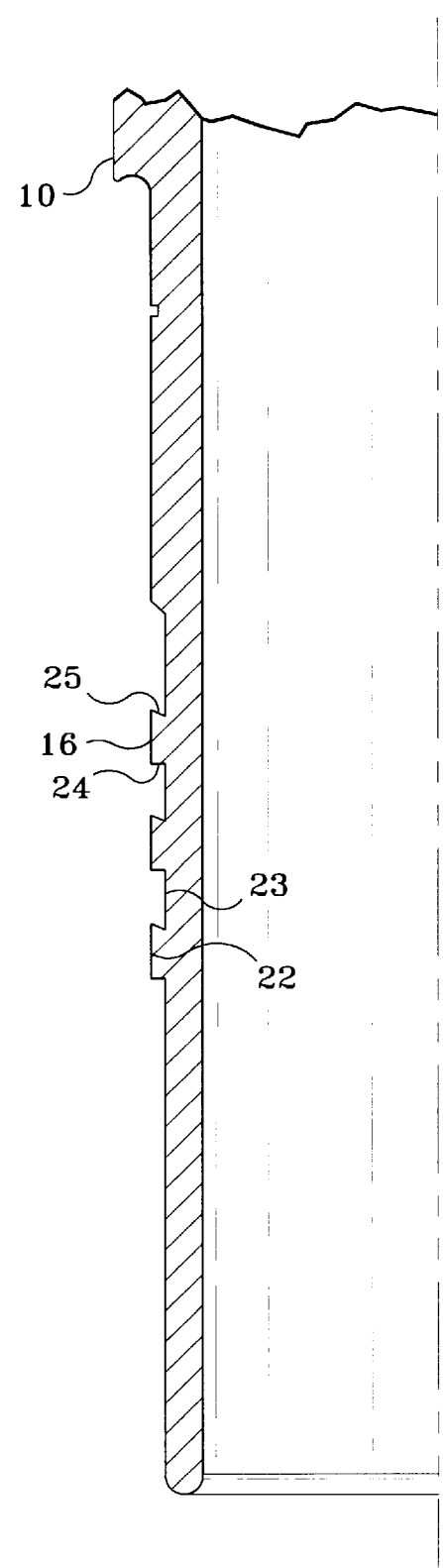
FIG. 3 shows a partial cross-section of a pin member.

FIG. 3 shows a partial cross-section of the pin member 10. The pin member 10 includes pin member threads 16, which have pin thread crests 22 and roots 23. Also shown are pin member stab flanks 24 and load flanks 25.

FIG. 4 shows a partial cross-section of the threaded connection prior to final make-up. The figure shows the connection at the point of threaded engagement at which the first stab flank 30 on the pin member contacts the first stab flank 31 on the box member. In this position, one can see that the axial spacing between the nose face 18 and the first stab flank 30 on the pin member, and the axial spacing between the nose face 20 and the first stab flank 31 on the box member, form guiding surfaces 32 on the pin member and 33 on the box member. These guiding surfaces facilitate entry of the pin into the box member and function as self-centering means to align the pin and box members upon threaded engagement to avoid cross-threading. This configuration prevents cross-threading by constricting the relative orientation of the pin and box members at the point of threaded engagement.

FIG. 5 shows the threaded connection in a fully made-up condition. The tolerances of the thread form are designed so that when the joint is fully made-up, although the load flanks are in intimate contact, the clearances remain between the stab flanks to ensure that compressive loads on the pin and box members are transferred substantially through the pin and box shoulders rather than through the thread form. FIG. 5 shows stab flanks 24, 28, 30, and 31 as substantially square. Load flanks 25 and 29 form angle B with respect to a line drawn perpendicular to the longitudinal axis 13 of the connection. Load flanks angle B is preferably between 0 degrees and about 30 degrees, but may vary outside the upper limit of this range depending on the application. This is referred to as a "nonpositive" or "reverse" angle, or, if the angle is greater than 0 degrees, a "trapped" flank. A "trapped" flank also is known as a "hooked" thread. In this configuration, the thread crest extends over the thread root. The nonpositive angled load flanks help ensure that the threads do not slip out and become disengaged during axial loading in tension.

In addition to providing trapped thread flanks to prevent jumpout, the present invention provides trapped nose faces as well. FIG. 5 shows annular shoulders 19 and 21 trapping nose faces 18 and 20 as the threaded connection achieves its fully made-up condition. Nose faces 18 and 20 are radially balanced to provide a radially balanced resistance to axial loading in compression. The radially balanced nose face efficiently distributes compressive forces and allows the nose face to withstand increased compressive loading without yielding. The preferred embodiment represented shows a generally rounded nose face, but it should be understood that several alternative configurations such as a "V" shape or a square plug configuration may be used to achieve a radially balanced trapped nose face. The configuration may also be reversed such that the nose face receives a squared plug shoulder, or a rounded or "V" shape shoulder extension. Several alternative configurations such as these may be used without departing from scope and spirit of the invention.

Figure 6:
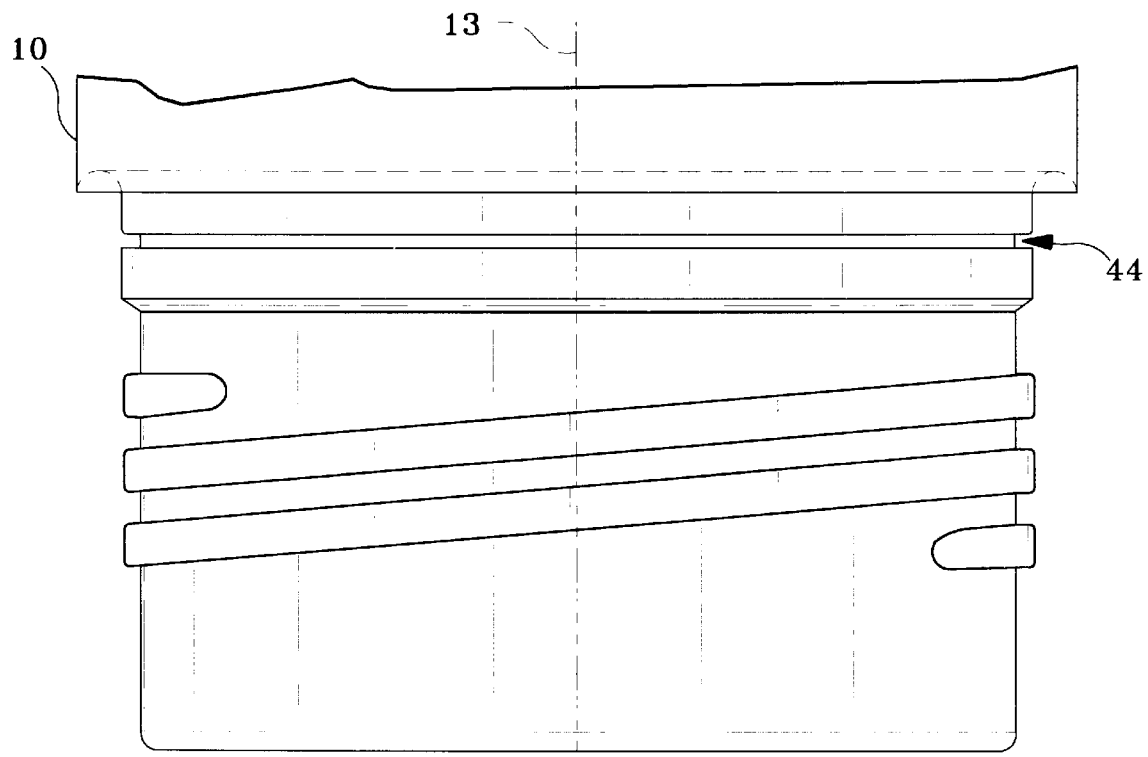
FIG. 6 shows the lower end of a pin member.
Figure 7:
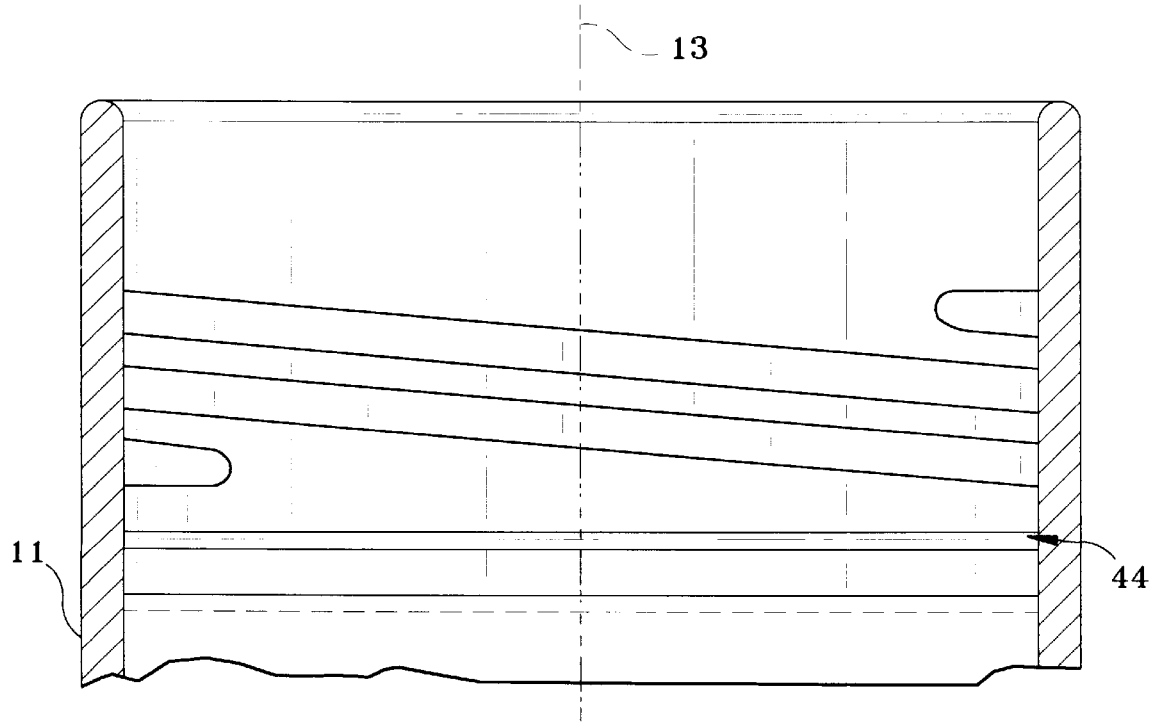
FIG. 7 shows a cross-section of the upper end of a box member.

FIG. 6 shows the lower end of a pin member 10. FIG. 7 shows a cross-section of the upper end of box member 11. Seal groove 44 is identified in FIGS. 6 and 7. Seal groove 44 on the pin member is located proximate the shoulder of the pin member and seal groove 44 on the box member is located proximate the shoulder of the box member. Each of these seal grooves may be used to contain an elastomer ring or metal seal to seal the pin and box members from leakage. The connection may be designed to include one or both of these seal grooves, or may be configured to not include either seal groove. Regardless of whether a seal groove is included in the design, the annular shoulder region 47 of the pin member functions as a seal against the annular end region 48 of the box member, and the annular shoulder region 49 of the box member seals against the annular end region 50 of the pin member. As described above, the annular shoulder region in each member functions as a guiding surface as well as a sealing surface.

Figure 8:
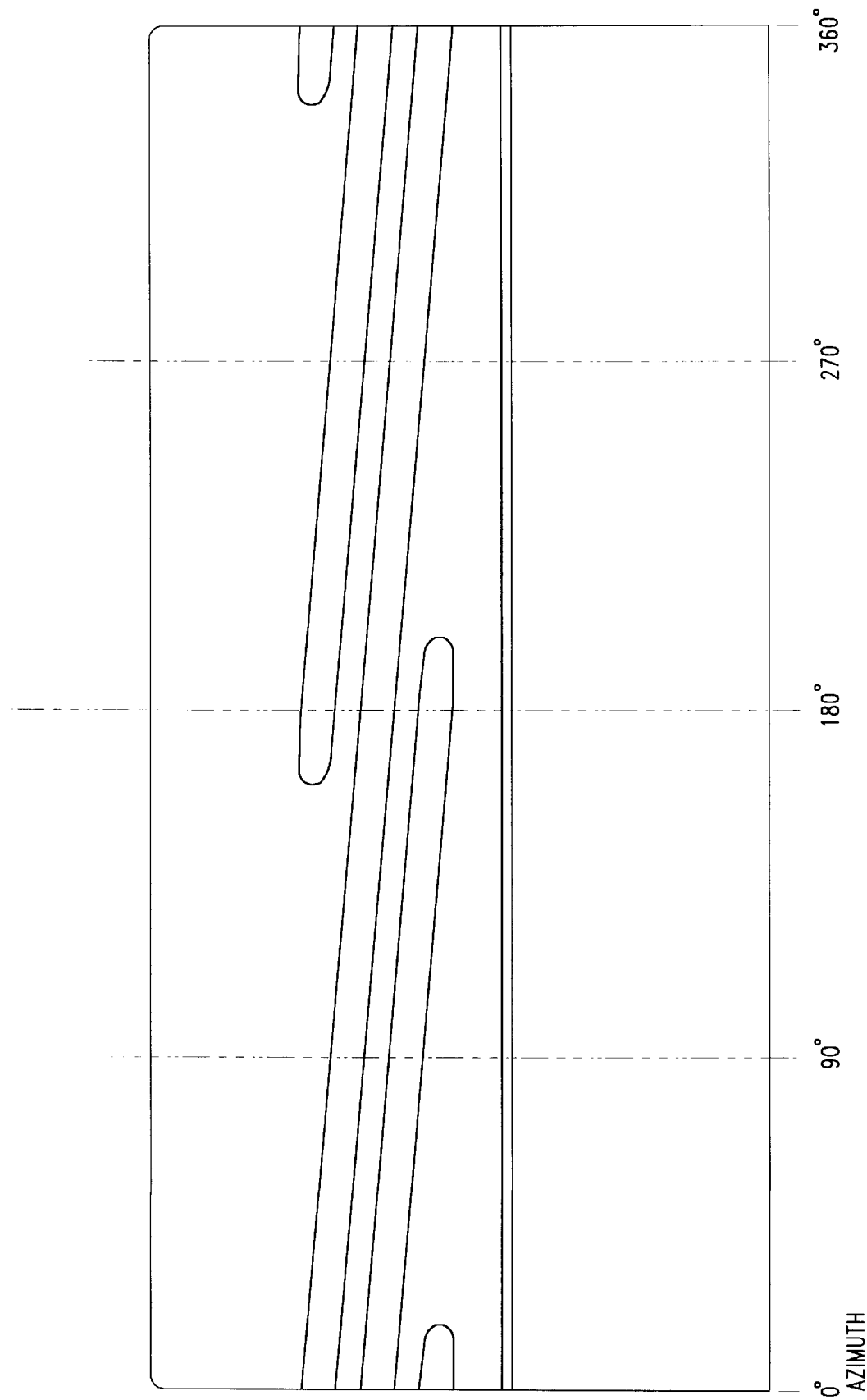
FIG. 8 shows an inner diameter surface flat layout view of a box member.

FIG. 8 shows an inner diameter surface flat layout view of a box member. The preferred double lead thread form can be seen more clearly in this flat layout view. As can be seen from this figure, the threads are configured to allow the joint to be fully made-up in approximately one and one-half turns. This quick make-up feature provides significant advantages in the field. The present invention can be configured with a single lead thread form or a multiple (two or more) lead, but the preferred embodiment uses a multiple lead thread design because it has been found to provide a stronger connection. The multiple lead thread design also contributes to the quick make-up feature of the present invention because a double thread will advance twice as far as a single thread for each turn of the connection.

The above disclosure and description is illustrative and explanatory of the present invention, and it is understand that various changes in the method steps as well as in the details of the illustrated apparatus may be made within the scope of the following claims without departing from the spirit of the invention.

We claim:

1. A subterranean well apparatus for connecting tubular members comprising:

a pin member with substantially straight external threads formed between an external annular shoulder and a nose face, a box member with substantially straight internal threads formed between an internal annular shoulder and a nose face;

wherein, upon threaded engagement of the pin member and the box member to form a connection, the nose face of the pin member is in intimate contact with the internal annular shoulder of the box member, and the nose face of the box member is in intimate contact with the external annular shoulder of the pin member;

the nose face of the box member being axially displaced from the most adjacent thread flank of the box member, and the nose face of the pin member being axially displaced from the most adjacent thread flank of the pin member;

the pin and box nose faces configured to provide radially balanced resistance to compressive loads on the pin and box members;

the annular cross-sectional areas of the pin and box members being substantially equal;

the external annular shoulder of the pin member configured to trap the nose face of the box member, and the internal annular shoulder of the box member configured to trap the nose face of the pin member;

the threads of the pin and box member configured to provide substantially full make-up of the joint within approximately one and one-half turns;

the external threads of the pin member having a load flank angled nonpositively relative to a plane normal to the longitudinal axis of the connection; and the internal threads of the box member having a load flank angled nonpositively relative to a plane normal to the longitudinal axis of the connection.

2. The apparatus of claim 1, wherein the pin and box members have a single lead thread form.

3. The apparatus of claim 1, wherein the pin and box members have a multiple lead thread form.

4. The apparatus of claim 1, having a seal groove proximate the shoulder of the pin member.

5. The apparatus of claim 1, having a seal groove proximate the shoulder of the box member.

6. The apparatus of claim 1, having a seal groove proximate the shoulder of the pin member and a seal groove proximate the shoulder of the box member.

7. The apparatus of claim 1, wherein the wall thickness of the pin member being slightly greater than one-half of the total wall thickness of the connection proximate the pin member's external annular shoulder, and the wall thickness of the box member being slightly less than one-half the total wall thickness of the connection proximate the box member's nose face.

8. The apparatus of claim 1, wherein the wall thickness of the pin member being slightly less than one-half of the total wall thickness of the connection proximate the pin member's nose face, and the wall thickness of the box member being slightly greater than one-half the total wall thickness of the connection proximate the box member's internal annular shoulder.

* * * * *